Figure 1:
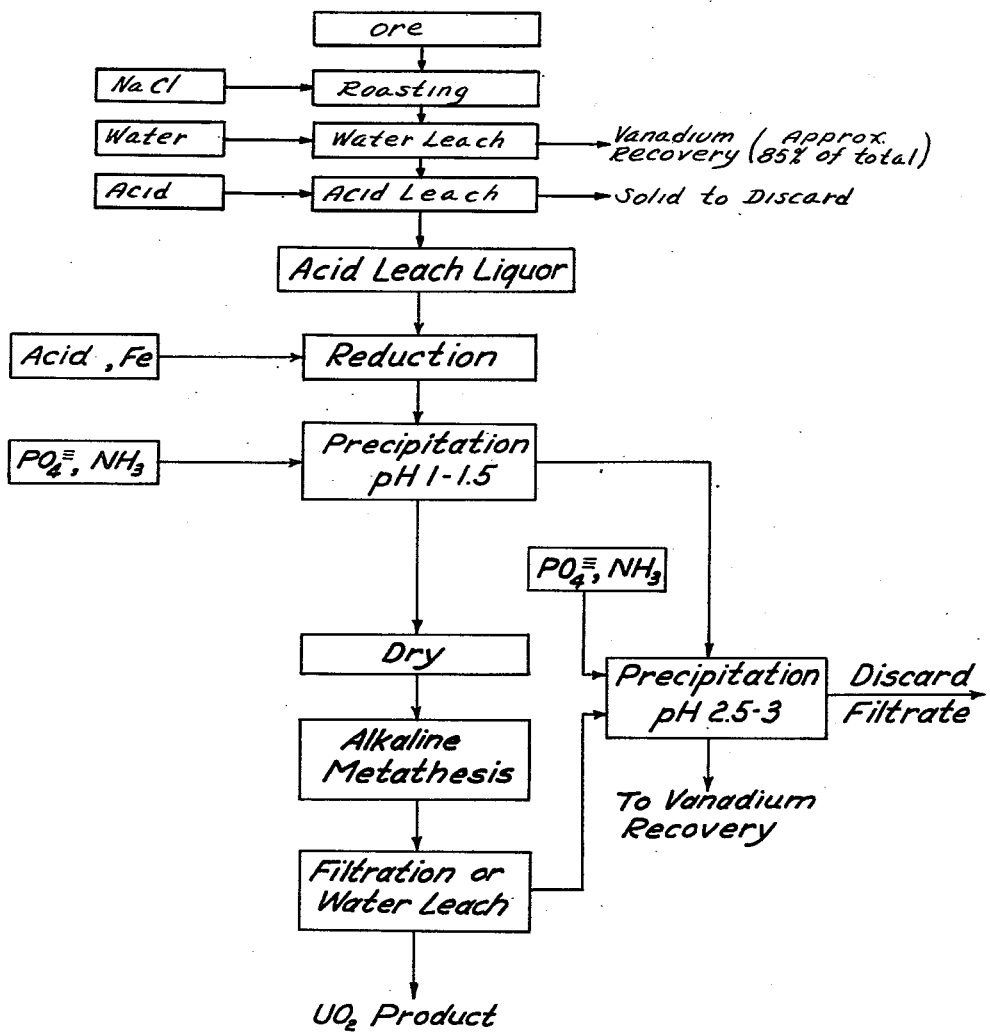

INVENTORS
William F. Arendale
Charles F. Coleman
ATTORNEY

INVENTORS
William F. Arendale
Charles F. Coleman
BY
Roland A. Anderson
ATTORNEY

United States Patent Office 2,797,143
Patented June 25, 1957

2,797,143

URANIUM-VANADIUM RECOVERY AND SEPARATION BY PHOSPHATE PRECIPITATION

William F. Arendale, Knoxville, and Charles F. Coleman, Oak Ridge, Tenn., assignors to the United States of America as represented by the United States Atomic Energy Commission Application November 29, 1950, Serial No. 198,066

11 Claims. (Cl. 23—14.5)

Our invention relates to a process for recovering uranium and more particularly to the treatment of liquors derived from carnotite and roscoelite type ores for the recovery of both the uranium and vanadium.

In a commercially important process, carnotite ores are worked on a plant scale for their major vanadium content by an oxidizing roast of the ore mixed with sodium chloride, followed by a water-leach of the calcines to dissolve most of the vanadium as a water-soluble sodium vanadate. Significant amounts of uranium and vanadium remain in the solid residues from the above water-leach step and are dissolved in a subsequent acid leach. Two processes have been used in the prior art to recover uranium and vanadium from the resulting acid leach solutions as follows:

(1) The "Pyro" process, which involves hydrolytic precipitation with sodium hydroxide or carbonate, oxidation of the resulting sludge type solids by roasting with added sodium ion, and removing solubilized vanadium from the roasted solids by a water-leach. The residue contains about 15% $U_3O_8$ which is further refined by standard methods.

(2) The above process was replaced by a method which again starts with a hydrolytic precipitation from an acid solution of most of the solids as a sludge using a base as the precipitant. The sludge is then redissolved in sulfuric acid and is purified by successive precipitation and removal of an iron vanadate cake and an alumina-silica cake, after which uranium is precipitated as sodium diuranate.

The iron vanadate cake is contaminated with about two percent uranium, which is recovered by recycling this cake to the salt roast with fresh ore.

In addition to the difficult filtration of the above sludges, the foregoing process has the inherent disadvantage in that the uranium is carried in solution through the subsequent process while precipitates are being removed. The reagents are inexpensive, but rather large quantities are required as the process solution is made alternately acid and basic.

An object of our present invention, therefore, is to provide an improved process for recovering uranium and vanadium from the acid leach solutions produced in the above described prior art process.

Another object of our invention is to provide a more economically feasible process for uranium and vanadium recovery from these solutions.

Additional objects and advantages of our invention will be apparent from the following description.

In accordance with our present invention, uranium and vanadium may be satisfactorily recovered from the acidic liquors derived from carnotite and roscoelite type ores as herein described, and from other solutions of approximately similar composition, by reducing the dissolved uranium and vanadium in the resulting leach liquor to substantially the 4 valence and 3 valence states, respectively, adding a source of phosphate ions to the reduced solution, precipitating uranium (IV) phosphate from the resulting solution by adjusting the pH to approximately 1 to approximately 1.5 separating, the uranium (IV) phosphate precipitate, subjecting the precipitate to an alkali fusion, thereby converting the uranium to $UO_2$ and solubilizing any residual vanadium therein, water leaching the residual vanadium from the resulting melt, adding a source of phosphate ions to the supernatant from the uranium precipitation step, precipitating vanadium (III) phosphate therefrom by adjusting the pH to approximately 2.5 to approximately 3.1, and recovering the vanadium from the resulting vanadium phosphate precipitate by roasting and water leaching the vanadium from the roasted material.

The double phosphate precipitation procedure of our invention permits removal of extraneous impurities in solution form. Required changes in pH are relatively small and are all in the acid range. Thus, minimum quantities of only a few relatively inexpensive reagents are required to effect efficiently both the selective separation and the recovery of uranium and vanadium in high yields.

In addition, the precipitates resulting from our process are all easily separated from associated supernatants by conventional filtration methods.

Our invention may be advantageously utilized to recover uranium and vanadium from a wide range of solutions containing relatively large proportions of extraneous impurities. However, since large volumes of uranium-vanadium solutions, as derived in the manner herein described, are available from plants processing carnotite ores, our invention will be further illustrated specifically with respect to these solutions. The following Table I shows the composition of five such solutions and serves to illustrate the generally complex nature of the solutions that may be successfully treated by our method for the recovery of uranium and vanadium.

TABLE I

| No. | 1 | 2 | 3 | 4 | 5 |
|---|---|---|---|---|---|
| Sp. Gr. | 1.04 | 1.032 | 1.026 | 1.024 | 1.047 |
| pH | 1.2 | 1.6 | 1.5 | 1.7 | 1.4 |
| Free acid, titrated to: | | | | | |
| pH 2.0 | 0.115 N | 0.030 N | 0.055 N | 0.017 N | 0.068 N |
| pH 2.5 | 0.156 N | 0.072 N | 0.091 N | 0.062 N | 0.135 N |
| Potential, volts (Pt-sat'd calomel) | 0.790 | 0.596 | 0.586 | 0.523 | 0.577 |
| Uranium, percent | 0.280 | 0.155 | 0.169 | 0.165 | 0.306 |
| Vanadium, percent | 0.227 | 0.142 | 0.139 | 0.154 | 0.288 |
| Iron, percent | 0.10 | 0.077 | 0.095 | 0.114 | 0.183 |
| Aluminum, percent | 0.165 | 0.022 | 0.026 | 0.019 | 0.034 |
| Calcium, percent | 0.20 | 0.077 | 0.102 | 0.148 | 0.223 |
| Silica, percent | 0.293 | 0.137 | 0.149 | 0.144 | 0.325 |
| Chloride, percent | | 1.74 | 1.32 | 1.76 | 2.38 |
| Fluoride, percent | | 0.0096 | 0.0083 | 0.012 | 0.011 |
| Sulfate, percent | 0.88 | 1.23 | 0.86 | 0.63 | 0.73 |
| Phosphate, percent | 0.08 | 0.046 | 0.051 | 0.041 | 0.080 |

The uranium and vanadium in these solutions may be rdeuced either electrolytically or by use of a chemical reducing agent. However, we find that the use of a reducing metal is much cheaper and simpler than other known reduction methods and therefore our invention will be further illustrated specifically with respect to the reducing metal method.

The acid leach solutions as indicated by the above Table I generally have a pH of 1 to 2. We find that the reduction step consumes acid and, in addition, that better results are achieved in the phosphate precipitation step, described hereinafter, when the phosphate is added at a pH less than 1. Thus, it is preferred that sufficient additional acid be added to the original solutions before reduction to lower the pH to a value below 0.5. In general, the total acid requirement for the reduction step is somewhat greater than four moles of hydrogen ion per mole of uranium and vanadium. Although other acids may be satisfactorily utilized for supplying hydrogen ions for the reduction step, HCl is slightly preferred and our invention will be further illustrated specifically with respect to HCl.

Generally, when utilizing the solutions listed in Table I, about 2½ to 6 ml. of concentrated HCl (approximately 12 M, 37% to 38% HCl)/100 ml. of solution usually constitutes an adequate additional acid supply for the reduction step while about 4 to 5 ml. concentrated HCl/100 ml. of solution appears to be best.

After adjusting the pH, the uranium-vanadium solution may be reduced by contacting with a metal that is above hydrogen in the electromotive series, for example zinc or aluminum. However, iron is preferred because of its cheapness, ease of separation from uranium deposits and good rate of reduction capacity. The progress of reduction may be followed by measuring means such as the platinum saturated calomel electrode system. When a potential of approximately $-0.350$ volt is reached (with the sign so chosen that a greater positive number represents a higher oxidation state), we find that the uranium and vanadium may be considered satisfactorily reduced to 4 and 3 valence states, respectively, while further reduction is not deleterious to the following precipitation process.

A stoichiometric excess of the reducing metal should be utilized, preferably in a packed column arrangement, the metal being in the form of chips, shavings, or slugs. When utilizing approximately 1 to approximately 8 liters of the solution herein described, suitable reducing metal surface areas are from about 250 square centimeters to about 500 square centimeters, while a surface area of about 350 square centimeters is generally preferred. We find that effective reduction may be achieved by recirculating the solution over the metal until the proper potential is obtained.

The reduction temperature is not critical. However, the rate of reduction increases with temperature and the reduction should, therefore, be effected within the range of approximately 50° C. to approximately 90° C. and preferably at approximately 90° C.

When utilizing preferred temperatures, metal surface areas and acid conditions, suitable reduction times are from about one-half hour to about two and one-half hours, a reduction period of two hours usually insuring optimum results.

During the reduction, a black deposit which resembles uranium dioxide may form on the reductor surfaces which may slow the rate of reduction. We find that this deposit may be easily removed by agitation, the rate of deposition and removal being dependent upon the flow rate and turbulence of the solution through the column. Thus, we find that a column in which the reducing metal may be agitated by a turbulent upward flow of the circulating solution increases the rate of reduction of the solution and the removal of any resulting deposit. The deposited uranium compound which is removed by agitation or turbulence may be carried over with the reduced solution into the following phosphate precipitation step without any deleterious effects on the process, since the uranium compound is readily collected with the uranous phosphate precipitate and is amenable to treatment by the remaining steps of the process. At the end of the process cycle, any residual uranium remaining on the reducing metal surfaces may be easily recovered by a conventional method such as acid flushing of the metal.

Uranium may be precipitated from the resulting reduced solution by the addition of sufficient phosphate ions and adjustment of the pH. In general, any source of phosphate ions may be utilized to precipitate the uranium. Orthophosphoric acid, pyrophosphoric acid and alkali metal salts of both these acids are all suitable for the precipitation, not only of uranium, but of the vanadium as well, in the vanadium (III) phosphate precipitation step hereinafter described. In view of their cheapness and greater availability, sodium pyrophosphate, sodium orthophosphate and di-sodium phosphate are usually preferred. Good results are obtained when slight stoichiometric excesses of phosphate are utilized. However, optimum results appear to be obtained when the phosphate concentration is in approximately 25% excess over that required by the formula $U_3(PO_4)_4$.

Values of pH ranging from approximately 1.0 to approximately 1.5 appear suitable for uranium (IV) phosphate precipitation from the reduced solution but particularly advantageous results appear obtainable utilizing a pH close to 1.0. The pH may be adjusted with an alkaline reagent. However, ammonia gas is preferred because it does not produce local excess of reagent, and because it is cheaper and is more convenient to handle than caustic.

Although the temperature of this uranium precipitation is not critical, we find that better results are obtained at higher temperatures. Thus, temperatures of about 50° C. to about 90° C. may be advantageously utilized and the highest portion of this range is preferred.

The uranium (IV) phosphate precipitate may be converted to a uranium dioxide cake by an alkaline metathesis step, suitable reagents including the hydroxides and carbonates of sodium and potassium. The hydroxides may be utilized in a fusion procedure or in an aqueous solution digestion procedure. However, since the hydroxides involve unusual corrosion and handling problems, since carbonate fusion appears to provide excellent results, and carbonates are usually less expensive than other reagents and may be handled by conventional techniques, our invention will be further illustrated specifically with respect to carbonate fusion.

A weight of carbonate flux approximately one and a quarter times the weight of the dry uranium precipitate is usually required for optimum results. However, sodium chloride may be utilized to replace a part of the carbonate so long as a basic leach is obtained afterwards. A mixture of 60% sodium carbonate, 40% sodium chloride is generally preferred as the fusion flux for the uranium (IV) phosphate precipitate.

Suitable fusion temperatures are approximately 850° C. to approximately 1,000° C. However, temperatures of approximately 900° C. to approximately 950° C. are usually preferred.

The resulting melt may be cooled and leached with hot water leaving the uranium dioxide as a very fine black powder. The resulting phosphate-carbonate solution may be saved for the purpose described below. The $UO_2$ cake may be washed with approximately 1% to approximately 3% ammonium carbonate solution and then with water, for further purification purposes, with little loss of uranium.

The supernatant from the uranium (IV) phosphate precipitation step contains substantially all the initial vanadium. This vanadium may be precipitated as the phosphate by adding a suitable amount of phosphate ions and raising the pH to at least 2.5, preferably between 2.5 and 3.1. Best results are usually obtained at a pH of approximately 2.8.

To effect substantially quantitative precipitation of vanadium under the above pH conditions, phosphate ion equivalent to about 1 to about 8 times the molar concentration of the vanadium generally is satisfactory, while phosphate ion equivalent of 1.25 is preferred. An unusual economy in the process may be effected by adding to the vanadium precipitation step the phosphate-sodium carbonate solution resulting from the uranium fusion step previously described. In addition to the phosphate being reused, the carbonate content of the latter solution may be utilized to contribute towards raising the pH of the vanadium solution, while fresh alkaline reagent, preferably ammonia gas, may be used, if necessary, to complete the pH adjustment.

The preferred temperature conditions for the vanadium (III) phosphate precipitation are substantially similar to those in the uranium precipitation step.

We find that the precipitated vanadium phosphate acts as an unexpectedly efficient scavenger of the small amount of uranium that may fail to precipitate in the uranium precipitation step of our process.

The vanadium (III) phosphate precipitate may then be treated for further vanadium purification and recovery by roasting at about 350° C. to about 650° C. for one-fourth to two hours, 600° C. and one hour being preferred. If additional HCl is desired for process recycle, NaCl may be added to the roast. However, the salt roast does not appear any better than the roast without an additive. The vanadium may then be leached from the roasted material with water. Any uranium remaining in the residue may subsequently be removed by a conventional aqueous sodium carbonate leach.

As an alternative, the vanadium (III) phosphate may be recycled to the original salt-roast of the ore as hereinafter described.

In a preferred procedure for carrying out the recovery of uranium and vanadium from a solution in accordance with our invention, about 5 parts concentrated HCl/100 parts solution is added to a batch of solution of the same general composition as those described in Table I. The resulting solution is then permitted to flow from a reservoir into a column packed with iron and providing a sufficient iron surface area, e. g., 50 square centimeters per liter of solution. In effecting the reduction, the solution is heated from room temperature to about 80° C. and is recycled through the column by means of a gas lift until the potential, as measured with a platinum saturated calomel electrode system, is at least −0.350 volt. Approximately a 1.25 excess of solid, hydrated di-sodium phosphate is then added to the hot solution in the reservior while stirring. When the phosphate is dissolved and well mixed, ammonia gas in passed into the solution until the pH is raised to about 1.5. After about two to about three hours, the resulting uranium (IV) phosphate precipitate may be separated by means of a suitable filter e. g., a plate-and-frame filter press. The resulting filtrate is saved for vanadium recovery. The precipitate is then dried and mixed with about one and one quarter times its weight of a solid mixture of 60% sodium carbonate-40% sodium chloride. The resulting mixture is placed in an iron pot and is fused in a furnace controlled at about 950° C. The melt is then removed from the furnace, solidified, broken into small pieces, and leached with hot water, the carbonate, chloride and phosphate content of the melt dissolving readily leaving the uranium product as a fine black powder, which is probably $UO_2$.

The filtrate which is saved for vanadium recovery is heated to approximately 90° C. The carbonate solution resulting from the disclosed leached-fusion step and which contains some phosphate, is added to this filtrate to supply a portion of the hydroxyl and phosphate requirements of the vanadium phosphate precipitation step. Additional phosphate is then added in the form of sodium orthophosphate until the phosphate concentration is equivalent to approximately 1.25 times the molar concentration of the vanadium. Ammonia gas is then passed into the resulting phosphate solution until a permanent precipitate is obtained (usually at about pH 3).

The resulting vanadium (III) phosphate precipitate, which also contains substantially all the uranium not precipitated in the uranium (IV) phosphate precipitation step may also be separated by the means of a suitable filter. The resulting filtrate may be discarded. The vanadium (III) phosphate cake is then roasted with approximately one-half its weight of sodium chloride at a temperature of 600° C. for one and one-half hours in an air stream of approximately one-quarter cubic foot per minute. The resulting calcines are water leached, leaving a small amount of residue, substantially all the vanadium values being dissolved. The water leach may become sufficiently acidic during contact with the calcines to leach some of the small amount of uranium present. This is avoided by the addition of a suitable small amount of sodium carbonate to the roast or leach. The uranium left in the residue is then easily recovered by leaching with a 3% solution of sodium carbonate and the vanadium is removed from the water leach by conventional sodium polyvanadate precipitation methods.

A number of modifications and alternative procedures for our process may be advantageously utilized. These are now discussed in substantially the order of the process steps already described.

It is noted that acid is added to the reduction step of our process. Since HCl is a by-product of the vanadium (III) phosphate roast, with or without added sodium chloride, this HCl may be recycled to satisfy partially the acid requirements of the reduction step.

In the uranium precipitation step, we find that the uranium (IV) phosphate, once precipitated, remains insoluble in acid solutions of noticeably lower pH. Thus, to insure satisfactory uranium precipitation without overburdening the following metathesis step with contaminants, the precipitation can be carried out at a pH of about 1 to about 1.5 and much of the impurity in the resulting cake washed out with an acid wash of pH less than 1. We find that this acid wash removes a large part of the vanadium and other acid soluble phosphates trapped in the precipitate. If the precipitation is carried out at a pH between 1.5 and 2.5, a considerable portion of the vanadium is precipitated with the uranium and can be separated either by the foregoing acid wash or by the carbonate fusion previously described, using proportionately greater amounts of either reagent.

The resulting acid wash solution may then be added to the reduction step as part of the acid requirement of that step and as a method of recovering the small uranium and vanadium content of the wash.

Another modification of our process involves recycling the vanadium (III) phosphate to the salt roast of the ore as herein described with reference to the prior art. With this modification, some build-up of aluminum and silicon concentrations may be obtained in the subsequent acid leach if these elements are present in the initial acid solution. It is believed that these increases could be handled satisfactorily; however, the phosphate recycle is a more difficult problem. All of the phosphate added before the vanadium precipitation enters the cake and about 70% to about 90% of this, if the vanadium (III) phosphate is recycled to the roast, would end up in the acid leach solution. This solution would contain a phosphate concentration at least four times the uranium concentration. This amount of phosphate requires the addition of larger amounts of acid during the reduction, decreases the rate of reduction, and also increases the amount of impurities in the uranium cake. However, the recycle of phosphate to the roast has some advantages, particularly in high calcium ores because the amount of by-product HCl is increased and some vanadium is released from insoluble calcium vanadate present therein. In addition, this recycle provides most of the phosphate required in the precipitation steps herein described.

Another modification of our process comprises precipitating the uranium and vanadium together as the phosphates at a pH of approximately 2.5 to 3.1 and preferably pH 2.8 after which the uranium may be recovered by a carbonate fusion similar to the one herein described. However, a much larger quantity of flux is required and the uranium is of lower purity. An alternative method of separating the uranium and vanadium in this modification would be to wash the precipitate with acid to remove the vanadium. However, the slurry, which is obtained from this acid wash, may be slimy and difficult to filter if silica is present, because of the non-reversible silica precipitation.

Still another modification comprises recovering the vanadium by an iron vanadate precipitation after the uranium is removed from the leach solution in accordance with our invention. The vanadium could be precipitated by oxidation of the solution and pH adjustment to precipitate ferric vanadate. The prior art procedure for this precipitation uses sodium chlorate as an oxidizing agent, with good recovery of the vanadium as iron vanadate at pH 3, the iron vanadate being recycled to the salt roast. However, iron vanadate does not scavenge the residual uranium as does vanadium (III) phosphate.

Figure 2:
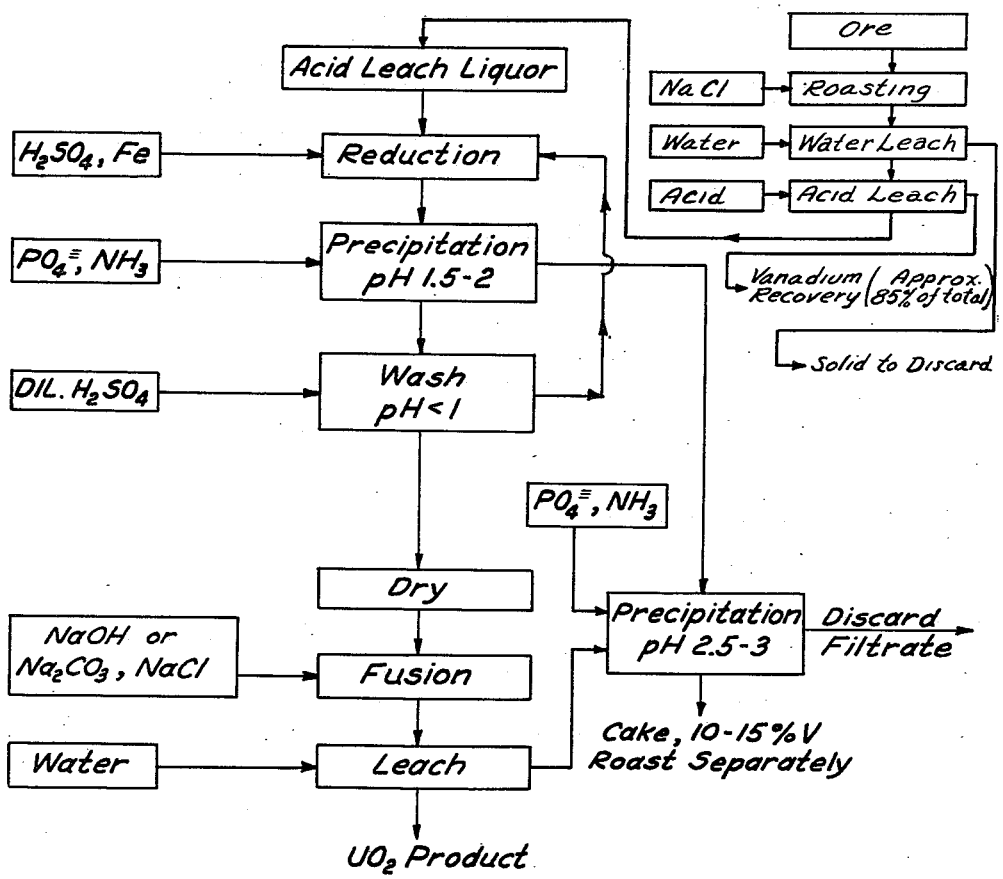
Figure 3:
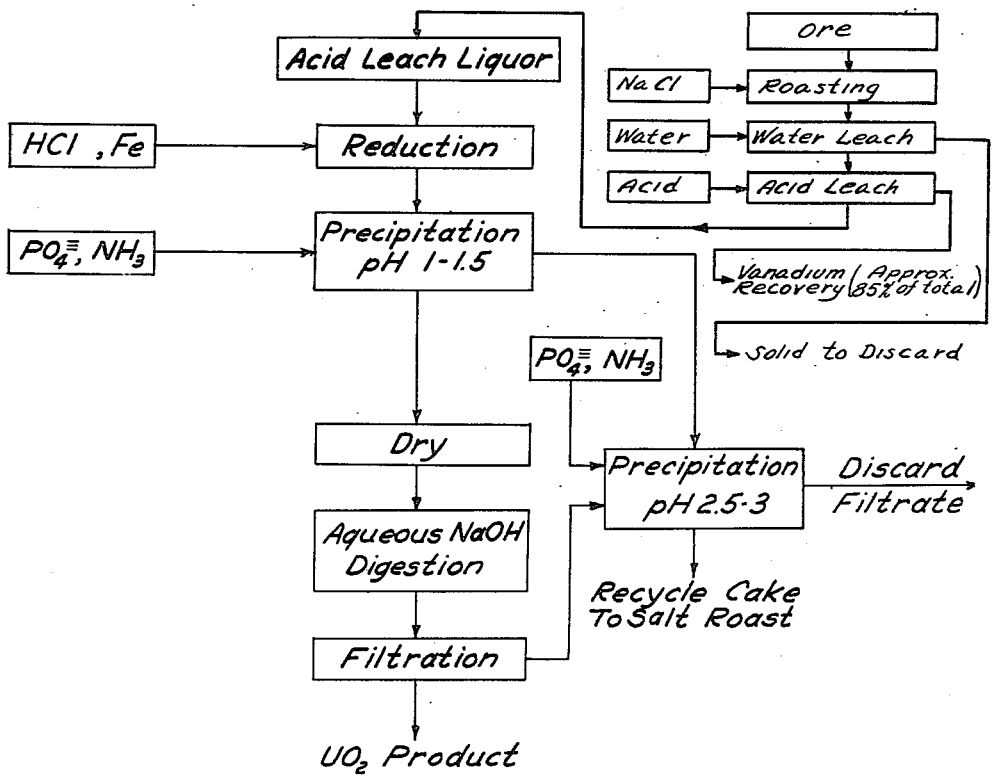

A general understanding of our process, and of the more pertinent modifications and alternative procedures associated therewith, may be had by reference to the attached drawings, Figs. 1, 2, and 3, forming a part of the present application. These drawings are in the nature of flow sheets, Fig. 1 illustrating the basic steps of our process, and Figs. 2 and 3 illustrating general combinations of steps in accordance with several embodiments of our invention as disclosed in this specification.

The following specific example illustrates our invention in greater detail.

Example I

Concentrated HCl was added slowly to 8 liters of solution identified as No. 1 in Table I, column 2 of this specification, until a pH 0.5 was obtained. The resulting solution, after being heated to approximately 80° C., was then continuously circulated by means of a nitrogen gas lift through a 10" by ¾" glass column filled with ³⁄₁₆" x ³⁄₁₆" slugs cut from mild rolled steel and having an effective surface area of about 300 square centimeters. The temperature of the solution was maintained by passing steam through a U-tube in the solution reservoir. Small samples were removed from time to time and the potential was measured with a platinum saturated calomel electrode system. The solution was reduced in this manner for approximately two and one-half hours at the end of which time the potential was −0.350 volt. Eighteen grams of di-sodium phosphate heptahydrate were added as a solid to the hot, reduced solution while stirring. When the phosphate was dissolved and well mixed, ammonia gas was passed into the solution until the pH was raised to 1.5. The resulting phosphate slurry was digested for approximately 15 minutes and the uranium (IV) phosphate precipitate was then collected on a Buchner funnel using hardened filter paper (Whatman No. 50). The uranium (IV) phosphate cake was dried for about one hour at 150° C., ground to a fine powder and mixed with 36 grams of sodium carbonate and 24 grams of sodium chloride, and the mixture was placed in a graphite crucible. The mixture was then fused for approximately one hour in a small muffle furnace controlled at 950° C. The resulting melt was cooled and dissolved in hot water leaving uranium dioxide as a very fine black powder.

The quality of the cake obtained was as follows (dry basis):

|   | Percent |
|---|---|
| U | 80.1 |
| Na | 2.0 |
| $P_2O_5$ | 0.2 | and from spectrographic analyses:

|   |   |
|---|---|
| Cu | 1.0 |
| Ca | 0.8 |
| Na | 0.6 |
| Mg | 0.15 |
| Si | 0.1 |
| Al | 0.06 |
| V | <0.1 |
| As | <0.2 |
| Sn | <0.1 |
| Ti | <0.04 |
| Mo | <0.04 |
| B | <0.001 |

This uranium content is equivalent to 90.9 percent $UO_2$, or 94.5 percent $U_3O_8$.

The uranium balance for this run was as follows:

|   | Percent |
|---|---|
| Product | 88.5 |
| Holdup in samples | 6.0 |
| Reductor holdup | 1.2 |
| Effluent | 1.8 |
| (Vanadium (III) phosphate was not precipitated.) |   |
| Acid wash of uranium (IV) phosphate | 0.01 |
| Carbonate solution after fusion | 0.001 |
| Final wash of product | 0.002 |
| Total | 97.5 |

The uranium recovery, credited with the two holdup items, was 95.7%.

The carbonate filtrate from the uranium product and the filtrate from the uranium precipitation step were combined.

Eighty-five grams of di-sodium phosphate heptahydrate were then added to the combined filtrates and the resulting solution heated to approximately 90° C. Ammonia gas was passed into the solution until the pH was raised to 2.8. The resulting vanadium (III) phosphate precipitate was collected on a Buchner funnel and the filtrate discarded. The precipitate was then roasted at 500° C. for approximately two hours and the resulting solubilized vanadium leached with water.

This water solution containing vanadium was then ready for further recovery by conventional red cake (sodium polyvanadate) precipitation or return to the water leach of the original ore for a similar precipitation.

In general, it may be said that the above example is merely illustrative and should not be construed as limiting the scope of our invention which should be understood to be limited only as indicated by the appended claims.

What is claimed is:

1. A process for recovering uranium and vanadium from an aqueous solution containing uranium, vanadium and extraneous impurities which comprises reducing said solution until substantially all the uranium and vanadium are reduced to $U^{+4}$ and $V^{+3}$, adding sufficient phosphate ions to the reduced solution at a pH of 1.0 to 1.5 to precipitate substantially all the uranium, separating the resulting uranium precipitate, adding sufficient phosphate ions to the supernatant from said separation at a pH of 2.5 to 3.1 to precipitate substantially all of the vanadium and separating the resulting vanadium precipitate.

2. The process of claim 1 in which the uranium precipitate is washed at a pH of 0.5 to 1.0 and the washings are returned to the reduction step.

3. A process for recovering uranium and vanadium from an aqueous solution containing uranium, vanadium and extraneous impurities which comprises reducing said solution at a pH of less than 1.0 until substantially all the uranium and vanadium are reduced to $U^{+4}$ and $V^{+3}$, adding phosphate ions in stoichiometric excess of the uranium in the resulting reduced solution, adjusting the resulting phosphate solution to a pH of 1.0 to 1.5, separating the resulting uranium precipitate from the resulting supernantant, adding phosphate ions to the separated supernatant in stoichiometric excess of the vanadium present therein, adjusting the resulting solution to a pH of 2.5 to 3.1 and separating the resulting vanadium precipitate.

4. The process of claim 3 in which the aqueous solution containing uranium, vanadium and extraneous impurities is reduced by continuously contacting said solution with a metal which is more basic than hydrogen until the uranium and vanadium are reduced to $U^{+4}$ and $V^{+3}$.

5. The process of claim 3 in which the aqueous solution containing uranium, vanadium and extraneous impurities is reduced with at least one metal selected from the group of metals consisting of zinc, aluminum and iron until the uranium and vanadium are reduced to $U^{+4}$ and $V^{+3}$.

6. In a process for recovering uranium and vanadium from an acid solution resulting from an oxidizing salt roast of a carnotite type ore followed by a water leach of the resulting calcines followed by an acid leach of the resulting water-leached solids, the steps which comprise reducing said acid solution at a pH of less than 1.0, until substantially all the uranium and vanadium are reduced to $U^{+4}$ and $V^{+3}$, adding phosphate ions in stoichiometric excess of the uranium in the resulting reduced solution, adjusting the resulting phosphate solution to a pH of 1.0 to 1.5, separating the resulting uranium phosphate precipitate from the resulting supernatant, adding phosphate ions to the separated supernatant in stoichiometric excess of the vanadium present therein, adjusting the resulting solution to a pH of 2.5 to 3.1 and separating the resulting vanadium phosphate precipitate, effecting an alkaline metathesis of said uranium phosphate precipitate to convert uranium values therein to a uranium oxide product and separating extraneous contaminants and residual vanadium from said product in an aqueous alkaline solution, combining the resulting alkaline solution with said supernatant, roasting said vanadium phosphate precipitate, and water leaching the resulting solubilized vanadium from the roasted precipitate.

7. The process of claim 6 in which the vanadium phosphate precipitate is recycled to the oxidizing salt roast step.

8. The process of claim 6 in which the alkaline metathesis of the uranium phosphate precipitate is effected by fusing said precipitate with at least one alkali selected from the group of alkalis consisting of alkali carbonates and alkali hydroxides and leaching the resulting fused mixture with a water solution to yield a solid uranium product and an aqueous alkaline solution containing extraneous contaminants and residual vanadium.

9. The process of claim 6 in which the alkaline metathesis of the uranium phosphate precipitate is effected by digesting said precipitate with an aqueous solution of an alkali hydroxide and filtering the resulting slurry to yield a solid uranium product and an aqueous alkaline solution containing extraneous contaminants and residual vanadium.

10. The process of claim 6 in which the alkaline metathesis of the uranium phosphate precipitate is effected by fusing said precipitate with a mixture of an alkali metal chloride and at least one alkali selected from the group of alkalis consisting of alkali carbonates and alkali hydroxides and leaching the resulting fused mixture with a water solution to yield a solid uranium product and an aqueous alkaline solution containing extraneous contaminants and residual vanadium.

11. The process of claim 6 in which hydrochloric acid by-product of the vanadium phosphate precipitate roasting step is added to the reduction step.

No references cited.